Aug. 4, 1970  W. F. MILLIER ET AL  3,522,696
HARVESTING APPARATUS
Filed Jan. 25, 1968  3 Sheets-Sheet 1
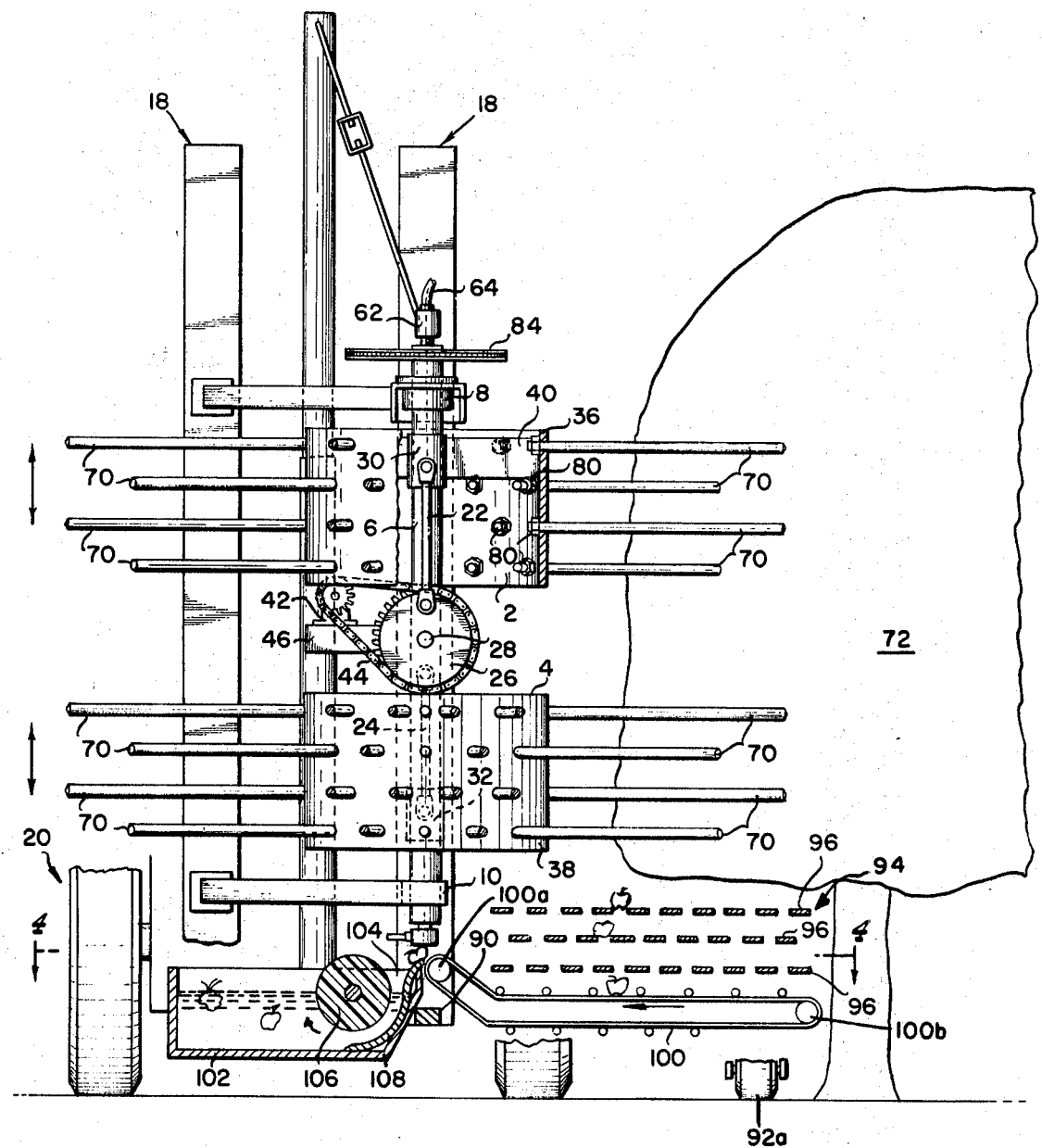
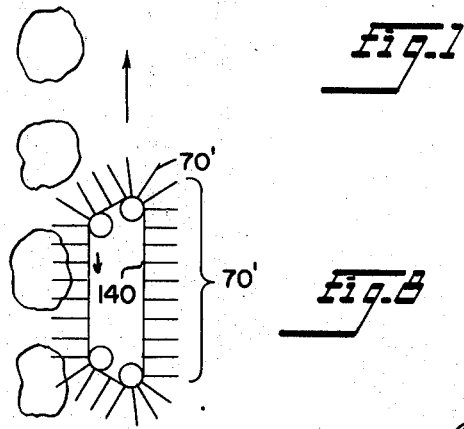
INVENTORS
WILLIAM F. MILLIER
GERALD E. REHKUGLER
KENNETH E. RYAN
JAMES A. THROOP
BY
Lawrence E. Laubscher  ATTORNEY Aug. 4, 1970         W. F. MILLIER ET AL         3,522,696
                    HARVESTING APPARATUS
Filed Jan. 25, 1968                          3 Sheets-Sheet 2
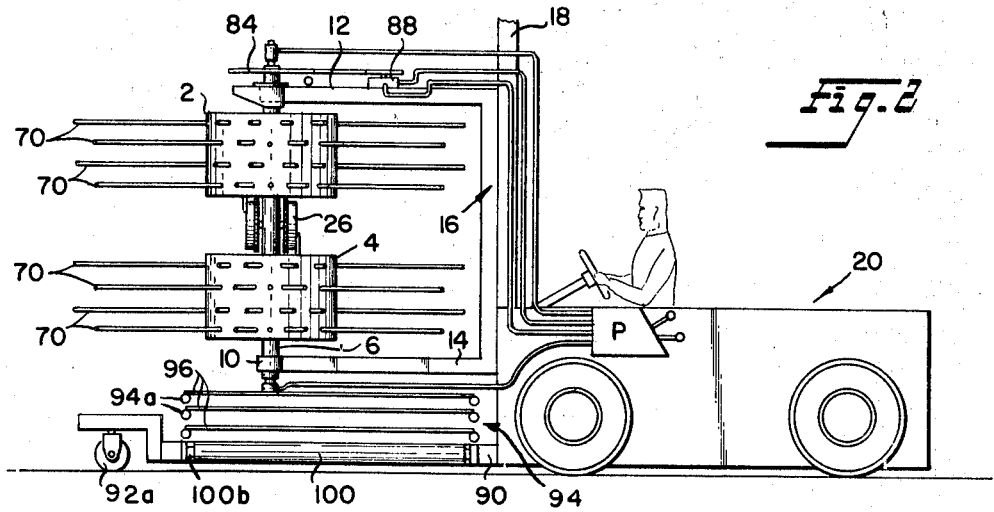
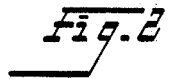
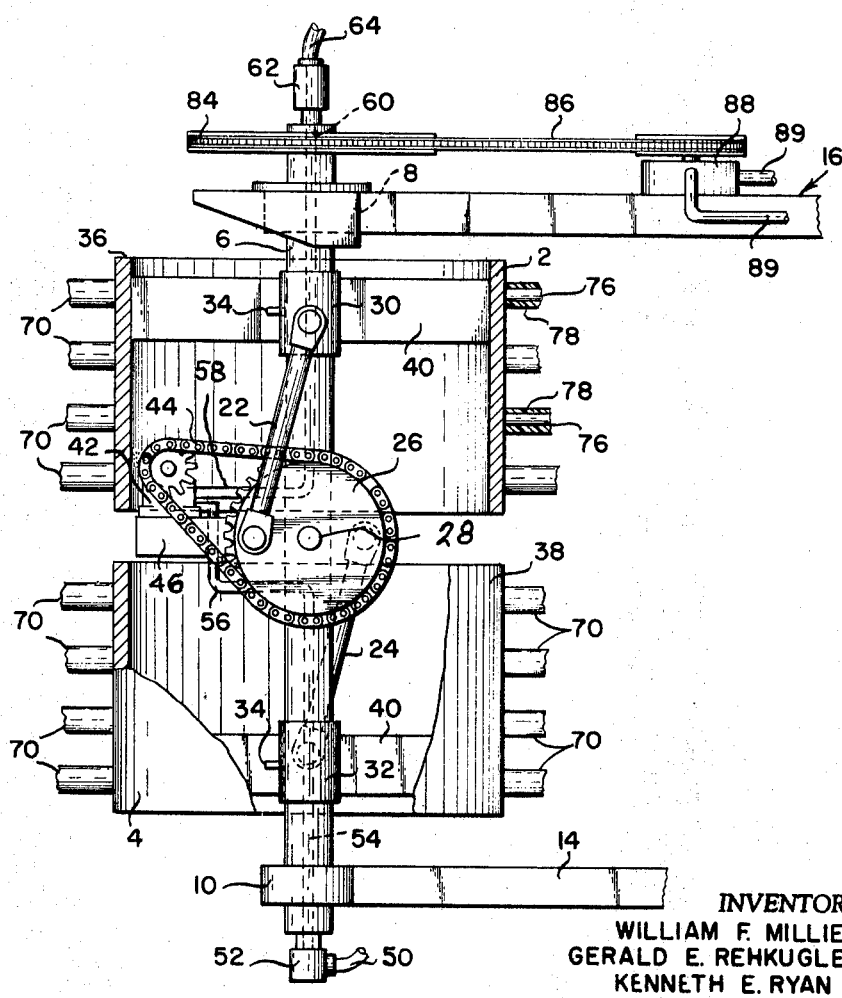
INVENTORS
WILLIAM F. MILLIER
GERALD E. REHKUGLER
KENNETH E. RYAN
JAMES A. THROOP
BY
Lawrence E. Laubscher  ATTORNEY Aug. 4, 1970   W. F. MILLIER ET AL   3,522,696
HARVESTING APPARATUS
Filed Jan. 25, 1968   3 Sheets-Sheet 3
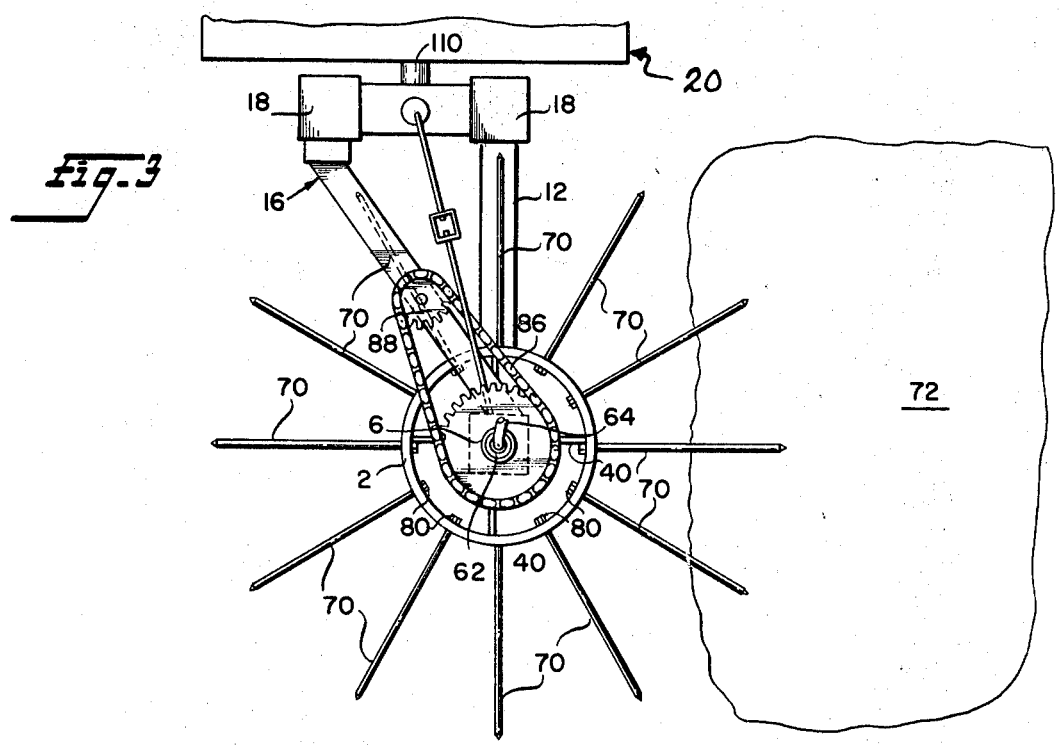
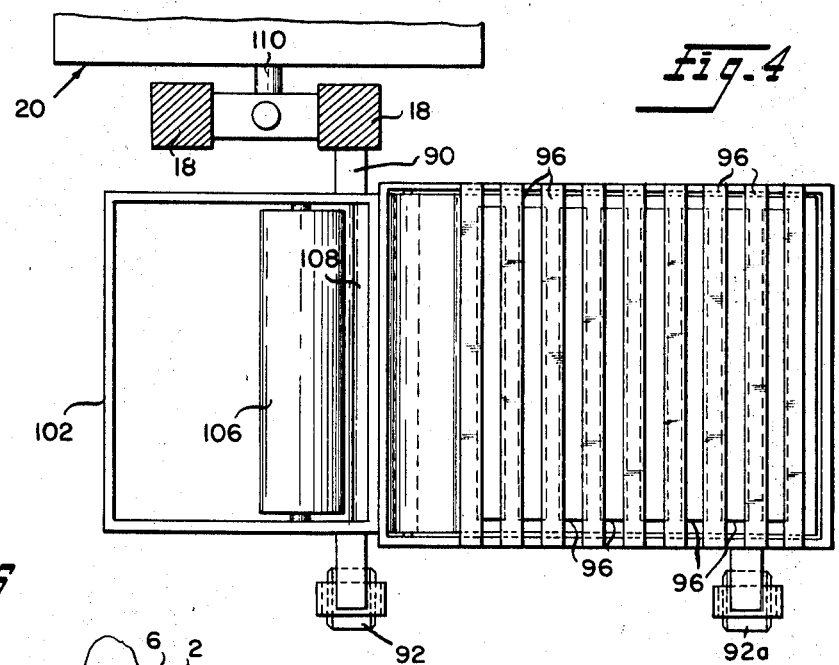
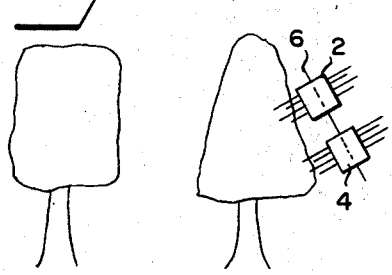
INVENTORS
WILLIAM F. MILLIER
GERALD E. REHKUGLER
KENNETH E. RYAN
JAMES A. THROOP
BY
Lawrence E. Laubscher ATTORNEY 3,522,696
            HARVESTING APPARATUS
William F. Millier, Riverside, Calif., and Gerald E.
  Rehkugler, Dryden, Kenneth E. Ryan, Cortland, and
  James A. Throop, Ithaca, N.Y., assignors to Cornell
  Research Foundation, Inc., Ithaca, N.Y., a corporation of New York
        Filed Jan. 25, 1968, Ser. No. 700,560
                Int. Cl. A01g 19/08
U.S. Cl. 56—328                                    11 Claims

ABSTRACT OF THE DISCLOSURE

Apparatus for continuously harvesting objects from trees including carriage means transportable adjacent a tree at a given linear velocity 40 insert oscillatory tine means therein. The invention is characterized by the provision of means connecting the tine means for movement relative to the carriage means in a direction opposite to the transport thereof and at such a speed that the resultant movement of the tines relative to the tree is zero, so that damage to the tree branches is avoided.

SPECIFICATION

In the patented prior art—as evidenced, for example by the patents to Polk, No. 3,143,844; Roberts, No. 2,867,964; Pool, No. 3,153,311, and Lasswell No. 3,040,507—various machines have been provided for harvesting fruit such as apples from trees. Major problems affecting the selection and use of the prior machines are their relative efficiencies, their fruit and/or tree damaging characteristics, speeds of operation, initial costs, and reliability. In the prior machines, the apparatus normally must be placed in a stationary position relative to the tree during harvesting, thereby materially reducing the number of trees that can be harvested within a given period of time.

The primary object of the present invention is to provide a continuous harvesting apparatus that is operable to shake objects from a tree during travel thereby at a given linear velocity. Vertically reciprocating tine means are carried by carriage means past the tree, said tine means being connected with the carriage means for movement in a direction opposite to the direction of travel, so that the horizontal movement of the shaker tines relative to the tree is zero, whereby tearing or damaging of the limbs and branches by the tines is avoided. In accordance with one embodiment of the invention, the longitudinal movement of the carriage itself effects the relative horizontal movement of the tines relative to the carriage. In another embodiment, the tine support means are positively driven at such a speed as to reduce the aforementioned relative movement to zero.

In accordance with another feature of the invention, the tine means comprises a plurality of horizontal tines adapted for radial insertion within a tree, said tines being carried by vertically oscillating support means. In one embodiment of the invention, the vertical support means comprises endless belt means extending longitudinally of the carriage. In the preferred embodiment, the vertical support comprises rotary drum means connected with the carriage for rotation about a vertical axis.

A more specific object of the invention is to provide harvesting apparatus including vibratory tine means including a pair of vertically arranged drums from which a plurality of horizontal tines extend radially outwardly for insertion within the tree foliage. The drums are reciprocably driven axially by pitman arm means eccentrically connected at one end with flywheel means, said flywheel means being rotatable about a horizontal axis carried by a vertical shaft upon which the drums are slidably mounted.

Another object of the invention is to provide improved means for catching, in a bruise-free manner, the objects shaken from the tree. The catching means includes web means comprising a plurality of vertically arranged horizontal layers of webs adapted for insertion beneath the tree, conveyor means arranged beneath the web means to receive the objects therefrom and to convey the same transversely away from the tree, and water tank means for receiving the objects from the conveyor. The water tank means includes a padded roller that serves both to submerge the objects and also to transport them in the tank away from the conveyor discharge area.

Other objects and advantages of the present invention will become apparent from a study of the accompanying drawing, in which:

FIG. 1 is a front elevational view of the continuous harvesting apparatus when in the branch shaking position relative to a tree, with parts broken away, shown in section and omitted for the purpose of clarity;

FIG. 2 is a side elevational view, on a reduced scale, of the apparatus of FIG. 1 with parts omitted;

FIG. 3 is a detailed top plan view of the harvesting apparatus of FIG. 1;

FIG. 4 is a sectional view taken along line 4—4 of FIG. 1;

FIG. 5 is an enlarged view of the tine means with portions broken away and shown in section to illustrate the drive means for oscillating the shaking drums;

FIGS. 6 and 7 illustrate various shapes to which trees may be pruned; and

FIG. 8 illustrates schematically a second embodiment of the invention as used for continuously harvesting fruit from a row of specially planted orchard trees.

Referring first more particularly to FIGS. 1–3, harvesting apparatus includes tree foliage vibrating means including a pair of colinear vertical drums 2, 4 mounted for oscillatory movement upon a vertical shaft 6. The shaft 6 is rotatably supported at each end by bearings 8, 10 carried by the upper and lower legs 12, 14, respectively, of a rigid C-shaped frame 16. As shown in FIG. 2, the frame is carried by the vertically adjustable mast 18 of carriage means 20 comprising a front load lift truck, tractor or the like.

The drums 2 and 4 are driven in opposite reciprocating directions on shaft 6 by means of pitman arms 22 and 24, respectively, the adjacent free ends of which are eccentrically connected with flywheel 26 that rotates about a hub shaft 28 extending transversely from the vertical shaft 6. Referring more particularly to FIGS. 1 and 5, the remote ends of the pitmans are connected with the drum sleeve portions 30, 32 that slide upon shaft 6, said sleeve portions being keyed against rotation relative to the shaft 6 by vertical slot and key means 34. The hollow cylindrical shell portions 36, 38 of the drums are connected with the sleeves by means of the radial arms 40. The flywheel includes a sprocket rim portion which is connected with the rotary hydraulic motor 42 by sprocket chain 44. The motor 42 is carried by a horizontal support 46 that extends orthogonally from the shaft 6 relative to flywheel axis 28. Pressure fluid is supplied to the motor from a conventional pump source on the carriage means via supply conduit 50, swivel connector 52, passage 54 in vertical shaft 6, and lateral conduit 56, the sump return flow path being defined by return conduit 58, internal shaft passage 60, swivel connector 62, and conduit 64. By the use of adjustable length arms, the stroke may be varied between about 4 to 6 inches.

The horizontal tines 70 extend radially from the drum shell portions for insertion within the tree foliage 72, said tines each including a rigid steel core 76 covered by a resilient layer of padding 78 and bolted tightly to the shells by nuts 80. The length of a tine is sufficient to extend appreciably within the foliage of a tree, and is preferably equal to about the radius of the foliage. In one working embodiment, tines were used having a length of about three feet.

At its upper end, the vertical shaft 6 may be rotatably driven, if desired, by means of sprocket gear 84, chain 86 (FIG. 2) and a second rotary hydraulic motor 88 carried by the C-frame 16. Pressure fluid is supplied to the motor 88 from a source in the carriage via conduits 89 (FIG. 5). As will be described below, the speed and direction at which the shaft 6 is driven is so selected relative to the speed and velocity of the carriage means that the resultant horizontal movement of the tines relative to the tree foliage within which they are inserted is substantially zero. In the event that the drive motor is deenergized, the drums will be automatically driven at substantially the desired speed by the cooperation between the tines with the foliage during travel of the carriage means.

Referring to FIGS. 1 and 4, the invention includes also catcher means for catching in a bruise-free manner the objects that are shaken from the tree. The catcher includes a longitudinally extending frame including a channel member 90 that is secured at its rear end with the mast 18, and is supported at its front end by wheel 92 (and also, if desired, by an optional additional wheel 92a). Extending from one side of the frame beneath the tree foliage are web means including a frame 94 having a plurality of vertically spaced parallel horizontal bars 94a for supporting a plurality of vertically spaced layers of parallel horizontal flexible straps 96 formed of a material such as polyvinyl-chloride-coated nylon or the like, the straps of each layer being parallel and staggered relative to the adjacent layer. Since the specific structure of the frame 94 is not a material part of the present invention, certain components thereof have been omitted for clarity. Connected with the channel member 90 and arranged beneath the web means is an endless horizontal conveyor 100 having end roller supports 100a, 100b, said conveyor being driven (for example, by a third hydraulic motor, not shown) in a transverse direction away from the tree, as shown by the arrow in FIG. 1. The objects deposited from the web means are conveyed to a water tank 102 and are deposited into the inlet space 104 between the adjacent tank wall and a longitudinally arranged resilient horizontal roller 106, which roller is also driven by the third hydraulic motor, not shown. The tank includes also stationary guide means 108 spaced from the roller 106 for guiding objects downwardly beneath the roller and away from the conveyor, which objects are then free to float to the surface for collection and removal by means, not shown.

OPERATION

In operation, as the carriage means is slowly driven by the tree at a velocity of about one mile per hour, the drums 2 and 4 are oppositely reciprocated (at a rate of about 300 cycles per minute) in a counterbalanced manner, whereby the foliage is vibrated by the tines to shake loose the fruit, nuts or the like. The objects fall in a bruise-free "pin-ball machine" manner downwardly through the tines, pass downwardly through the layers of the web means, are transported by the conveyor means for deposition in the water tank. Remembering that owing to the continuous transport of the carriage, an extremely high volume of objects are being shaken from the tree, the high capacity characteristics of the catcher means, and the specific design of the catcher means, functionally cooperate with the shaker means to produce a high-speed bruise-free harvesting machine. Furthermore, owing to the fact that the horizontal relative movement between the tines and the foliage is reduced to substantially zero, damage to the tree limbs and branches is avoided. By regulating the flow of pressure fluid, the speed of operation of the hydraulic motors may be controlled as desired.

The machine is particularly suitable for processing trees arranged in rows and pruned to have the shape shown in FIG. 6. In order to harvest objects from trees pruned to have the sun-exposed shape of FIG. 7, in accordance with a further feature of the invention the mast may be mounted for pivotal movement about the longitudinal horizontal shaft 110 (FIG. 3), whereby the shaft 6 and drums 2 and 4 may be tilted laterally to the position shown in FIG. 7.

According to another embodiment illustrated in FIG. 8, the horizontal tines 70' may be supported by a vertically arranged endless belt 140 carried by the carriage, said belt being driven in the direction opposite to the direction of travel of the carriage as shown by the arrows, whereby horizontal movement of the tines relative to the tree is avoided. It will be apparent that the apparatus may be readily driven continuously along a row of orchard fruit trees in an efficient manner as illustrated in FIG. 8. The orchard is preferably of the type including a hedgerow pruned trees of controlled size with close spacing.

Although the apparatus has been illustrated as including only one pair of oscillatory tine means, it is apparent that a plurality of pairs of tine means could be provided on the carriage, if desired. For example, in the shaking of dwarf, semidwarf or other trees of controlled size, it is possible to construct a carriage that is adapted to straddle the tree and to support separate tine means for simultaneously vibrating both sides of the tree during longitudinal transport of the carriage.

While in accordance with the provisions of the patent statutes we have illustrated and described the preferred forms and embodiments of the invention now known to us, it will be apparent to those skilled in the art that changes and modifications may be made without deviating from the inventive concepts of the disclosure.

What is claimed is:

1. Harvesting apparatus for shaking objects from a tree, comprising
    tine means including a pair of colinearly arranged vertical spaced relatively axially movable rotary drum means, and a plurality of horizontal tines secured to and extending radially outwardly from each of said drum means for engagement with the tree foliage;
    carriage means for transporting the tine means horizontally in one direction adjacent the tree to cause the tines to extend generally radially therein, said carriage means having a given first linear velocity;
    and vibrating means including means connecting said drum means for opposite vertical reciprocatory axial movement relative to each other and to said carriage means to shake the branches of the tree, said drum means being connected for rotation relative to said carriage means in the direction opposite said one direction and at substantially the same linear velocity as said carriage means first velocity, whereby the resultant horizontal movement of the tines relative to the tree in said one direction is substantially zero.

2. Apparatus as defined in claim 1, wherein said tine means further includes a vertical shaft connected with said carriage means, said drums being mounted for vertical sliding movement on said shaft;
    and further wherein said connecting means includes flywheel means rotatably connected with said shaft for movement about a horizontal axis extending radially thereto, and a pair of connecting rods each connected at one end eccentrically to said flywheel means and at the other end to one of said drums, respectively.

3. Apparatus as defined in claim 2, and further wherein said vertical shaft is rotatably connected with said carriage means.

4. Apparatus as defined in claim 3, and further including drive means for rotatably driving said vertical shaft relative to said carriage in a direction and at such a speed that the resultant movement of the tines relative to the tree is substantially zero.

5. Apparatus as defined in claim 3, and further including means tiltably connecting said shaft to said carriage means for pivotal movement about a horizontal axis longitudinal of the carriage means, whereby the shaft may be tilted to an acute angle relative to the vertical for the shaking of pyramidically shaped trees.

6. Apparatus as defined in claim 3, and further including means for vertically displacing said shaft relative to said carriage means.

7. Apparatus as defined in claim 3, and further including motor means for driving said flywheel means.

8. Apparatus as defined in claim 7, wherein said motor means comprises a hydraulic motor, and further including conduit means extending longitudinally of said shaft for supplying hydraulic fluid to and from said hydraulic motor.

9. Apparatus as defined in claim 1, wherein said tine means includes a plurality of tines extending horizontally from the support at different elevations, each of said tines comprising a rigid core, and a layer of resilient material padding the rigid core.

10. Apparatus as defined in claim 9, and further including catcher means connected with said carriage means beneath said tine means, said catcher means including a plurality of vertically spaced staggered layers of horizontally spaced parallel webs;
endless conveyor means arranged horizontally beneath said web means to collect objects deposited by gravity therefrom;
and liquid tank means arranged adjacent the discharge end of said conveyor means to receive objects discharged therefrom, said liquid tank means including means for submerging the objects beneath the level of the liquid contained therein.

11. Apparatus for catching objects shaken from trees, comprising a frame adapted for transport adjacent a tree;
web means carried by said frame for extension beneath the tree, said web means comprising a plurality of vertically spaced staggered layers of horizontally spaced webs, said webs being parallel to the longitudinal axis of said frame;
endless conveyor means arranged horizontally beneath said web means for conveying the objects that pass through said web means in a direction away from the tree and transversely of the frame;
and liquid tank means arranged adjacent the discharge end of said conveyor means to receive objects discharged therefrom, said liquid tank means including submerging means for submerging the objects beneath the level of the liquid contained therein, said submerging means comprising a resilient roller horizontally arranged at the upper portion of the tank in a direction longitudinally of the frame, said roller being spaced from the wall of the tank means adjacent the conveyor a distance generally equal to the diameter of the objects, said roller being rotatably driven in a direction effecting submersion of the objects and conveyance thereof away from the said wall.

References Cited

UNITED STATES PATENTS

| | | | |
|---|---|---|---|
| 3,396,521 | 8/1968 | McKibben et al. | 56—330 |
| 1,471,989 | 10/1923 | Weis | 56—400.21 XR |
| 3,184,908 | 5/1965 | Rust | 56—330 |
| 3,245,211 | 4/1966 | Weygandt et al. | 56—330 |
| 3,261,153 | 7/1966 | Johnston | 56—400 |
| 3,325,984 | 6/1967 | Christie et al. | 56—330 |
| 3,439,481 | 4/1969 | Hall | 56—328 |

RUSSELL R. KINSEY, Primary Examiner